United States Patent
Jin et al.

(10) Patent No.: US 7,626,685 B2
(45) Date of Patent: Dec. 1, 2009

(54) DISTANCE MEASURING SENSORS INCLUDING VERTICAL PHOTOGATE AND THREE-DIMENSIONAL COLOR IMAGE SENSORS INCLUDING DISTANCE MEASURING SENSORS

(75) Inventors: Young-gu Jin, Hwaseong-si (KR); Yoon-dong Park, Yongin-si (KR); Won-joo Kim, Hwaseong-si (KR); Seung-hoon Lee, Seoul (KR); In-sung Joe, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 12/222,208

(22) Filed: Aug. 5, 2008

(65) Prior Publication Data

US 2009/0244514 A1 Oct. 1, 2009

(30) Foreign Application Priority Data

Mar. 26, 2008 (KR) ...................... 10-2008-0027822

(51) Int. Cl.
*G01C 3/08* (2006.01)
*H01L 31/062* (2006.01)
(52) U.S. Cl. ..................................... 356/4.01; 257/290
(58) Field of Classification Search ....... 356/4.01–5.15; 257/290; 438/73; 377/57, 62, 63
See application file for complete search history.

(56) References Cited

U.S. PATENT DOCUMENTS

| | | | |
|---|---|---|---|
| 3,932,775 A * | 1/1976 | Kosonocky | 327/515 |
| 3,996,600 A * | 12/1976 | Patrin | 257/223 |
| 4,346,164 A | 8/1982 | Tabarelli et al. | |
| 4,374,334 A * | 2/1983 | Engeler | 327/65 |
| 4,480,910 A | 11/1984 | Takanashi et al. | |
| 4,509,852 A | 4/1985 | Tabarelli et al. | |
| 5,591,958 A | 1/1997 | Nishi et al. | |
| 5,602,407 A * | 2/1997 | Washkurak et al. | 257/223 |
| 5,610,683 A | 3/1997 | Takahashi | |
| 5,715,039 A | 2/1998 | Fukuda et al. | |
| 5,825,043 A | 10/1998 | Suwa | |
| 6,396,570 B2 | 5/2002 | Takayanagi et al. | |
| 6,486,503 B1 * | 11/2002 | Fossum | 257/215 |
| 7,053,357 B2 * | 5/2006 | Schwarte | 250/214.1 |
| 7,498,584 B2 * | 3/2009 | Moody et al. | 250/370.09 |
| 2002/0163629 A1 | 11/2002 | Switkes et al. | |
| 2003/0030916 A1 | 2/2003 | Suenaga | |
| 2003/0096199 A1 | 5/2003 | Nakagawa et al. | |

(Continued)

*Primary Examiner*—Isam Alsomiri
(74) *Attorney, Agent, or Firm*—Harness, Dickey & Pierce, P.L.C.

(57) ABSTRACT

A distance measuring sensor may include: a photoelectric conversion region; first and second charge storage regions; first and second trenches; and/or first and second vertical photogates. The photoelectric conversion region may be in a substrate and/or may be doped with a first impurity in order to generate charges in response to received light. The first and second charge storage regions may be in the substrate and/or may be doped with a second impurity in order to collect charges. The first and second trenches may be formed to have depths in the substrate that correspond to the first and second charge storage regions, respectively. The first and second vertical photogates may be respectively in the first and second trenches. A three-dimensional color image sensor may include a plurality of unit pixels. Each unit pixel may include a plurality of color pixels and the distance measuring sensor.

20 Claims, 7 Drawing Sheets

U.S. PATENT DOCUMENTS

| | | |
|---|---|---|
| 2003/0174408 A1 | 9/2003 | Rostalski et al. |
| 2004/0000627 A1 | 1/2004 | Schuster |
| 2004/0075895 A1 | 4/2004 | Lin |
| 2004/0109237 A1 | 6/2004 | Epple et al. |
| 2004/0114117 A1 | 6/2004 | Bleeker |
| 2004/0115567 A1 | 6/2004 | Mandal et al. |
| 2004/0118184 A1 | 6/2004 | Violette |
| 2004/0119954 A1 | 6/2004 | Kawashima et al. |
| 2004/0125351 A1 | 7/2004 | Krautschik |
| 2004/0136494 A1 | 7/2004 | Lof et al. |
| 2004/0160582 A1 | 8/2004 | Lof et al. |
| 2004/0165159 A1 | 8/2004 | Lof et al. |
| 2004/0169834 A1 | 9/2004 | Richter et al. |
| 2004/0169924 A1 | 9/2004 | Flagello et al. |
| 2004/0180294 A1 | 9/2004 | Baba-Ali et al. |
| 2004/0180299 A1 | 9/2004 | Rolland et al. |
| 2004/0207824 A1 | 10/2004 | Lof et al. |
| 2004/0211920 A1 | 10/2004 | Maria Derksen et al. |
| 2004/0224265 A1 | 11/2004 | Endo et al. |
| 2004/0224525 A1 | 11/2004 | Endo et al. |
| 2004/0227923 A1 | 11/2004 | Flagello et al. |
| 2004/0233405 A1 | 11/2004 | Kato et al. |
| 2004/0253547 A1 | 12/2004 | Endo et al. |
| 2004/0253548 A1 | 12/2004 | Endo et al. |
| 2004/0257544 A1 | 12/2004 | Vogel et al. |
| 2004/0259008 A1 | 12/2004 | Endo et al. |
| 2004/0259040 A1 | 12/2004 | Endo et al. |
| 2004/0263808 A1 | 12/2004 | Sewell |
| 2005/0007569 A1 | 1/2005 | Streefkerk et al. |
| 2005/0024609 A1 | 2/2005 | De Smit et al. |
| 2005/0030506 A1 | 2/2005 | Schuster |
| 2005/0036121 A1 | 2/2005 | Hoogendam et al. |
| 2005/0036183 A1 | 2/2005 | Yeo et al. |
| 2005/0036184 A1 | 2/2005 | Yeo et al. |
| 2005/0036213 A1 | 2/2005 | Mann et al. |
| 2005/0037269 A1 | 2/2005 | Levinson |
| 2005/0042554 A1 | 2/2005 | Dierichs et al. |
| 2005/0046934 A1 | 3/2005 | Ho et al. |
| 2005/0048223 A1 | 3/2005 | Pawloski et al. |
| 2005/0068639 A1 | 3/2005 | Pierrat et al. |
| 2005/0073670 A1 | 4/2005 | Carroll |
| 2005/0084794 A1 | 4/2005 | Meagley et al. |
| 2005/0094116 A1 | 5/2005 | Flagello et al. |
| 2005/0100745 A1 | 5/2005 | Lin et al. |
| 2005/0110973 A1 | 5/2005 | Streefkerk et al. |
| 2005/0117224 A1 | 6/2005 | Shafer et al. |
| 2005/0122497 A1 | 6/2005 | Lyons et al. |
| 2005/0132914 A1 | 6/2005 | Mulkens et al. |
| 2005/0134815 A1 | 6/2005 | Van Santen et al. |
| 2005/0141098 A1 | 6/2005 | Schuster |
| 2005/0145803 A1 | 7/2005 | Hakey et al. |
| 2005/0146694 A1 | 7/2005 | Tokita |
| 2005/0146695 A1 | 7/2005 | Kawakami |
| 2005/0147920 A1 | 7/2005 | Lin et al. |
| 2005/0153424 A1 | 7/2005 | Coon |
| 2005/0158673 A1 | 7/2005 | Hakey et al. |
| 2005/0164502 A1 | 7/2005 | Deng et al. |
| 2005/0174549 A1 | 8/2005 | Duineveld et al. |
| 2005/0175940 A1 | 8/2005 | Dierichs |
| 2005/0179877 A1 | 8/2005 | Mulkens et al. |
| 2005/0185269 A1 | 8/2005 | Epple et al. |
| 2005/0190435 A1 | 9/2005 | Shafer et al. |
| 2005/0190455 A1 | 9/2005 | Rostalski et al. |
| 2005/0205108 A1 | 9/2005 | Chang et al. |
| 2005/0213061 A1 | 9/2005 | Hakey et al. |
| 2005/0213072 A1 | 9/2005 | Schenker et al. |
| 2005/0217135 A1 | 10/2005 | O'Donnell et al. |
| 2005/0217137 A1 | 10/2005 | Smith et al. |
| 2005/0217703 A1 | 10/2005 | O'Donnell |
| 2005/0219481 A1 | 10/2005 | Cox et al. |
| 2005/0219482 A1 | 10/2005 | Baselmans et al. |
| 2005/0219499 A1 | 10/2005 | Maria Zaal et al. |
| 2005/0225737 A1 | 10/2005 | Weissenrieder et al. |
| 2005/0231694 A1 | 10/2005 | Kolesnychenko et al. |
| 2005/0237501 A1 | 10/2005 | Furukawa et al. |
| 2005/0237504 A1 | 10/2005 | Nagasaka et al. |
| 2005/0243292 A1 | 11/2005 | Baselmans et al. |
| 2005/0245005 A1 | 11/2005 | Benson |
| 2005/0253090 A1 | 11/2005 | Gau et al. |
| 2005/0259232 A1 | 11/2005 | Streefkerk et al. |
| 2005/0259233 A1 | 11/2005 | Streefkerk et al. |
| 2005/0270505 A1 | 12/2005 | Smith |
| 2006/0019204 A1 | 1/2006 | Endo et al. |
| 2006/0141400 A1 | 6/2006 | Hirayama et al. |

\* cited by examiner

DISTANCE MEASURING SENSORS INCLUDING VERTICAL PHOTOGATE AND THREE-DIMENSIONAL COLOR IMAGE SENSORS INCLUDING DISTANCE MEASURING SENSORS

PRIORITY STATEMENT

This application claims priority from Korean Patent Application No. 10-2008-0027822, filed on Mar. 26, 2008, in the Korean Intellectual Property Office (KIPO), the entire contents of which are incorporated herein by reference.

BACKGROUND

1. Field

Example embodiments relate to distance measuring sensors that include a vertical photogate. Example embodiments also relate to three-dimensional color image sensors that include distance measuring sensors. Also, example embodiments relate to distance measuring sensors that include a vertical photogate formed to a depth in a substrate and three-dimensional color image sensors that include distance measuring sensors.

2. Description of Related Art

A photogate depth sensor may measure the distance to an object by irradiating light on the object and calculating a delay time of light reflected from the object.

A color image sensor is a photoelectric conversion device that may transform detected light into electrical signals. A conventional image sensor may include a plurality of unit pixels arranged in an array on a semiconductor substrate. Each of the unit pixels may include a photodiode and/or a plurality of transistors. The photodiode may detect external light and/or may generate and store charges, and the transistors may output electrical signals according to the stored charges.

A complimentary metal oxide semiconductor (CMOS) image sensor may include a photodiode that can receive and/or store optical signals, and may realize images by using a signal processing device to control and/or process the optical signals. The photodiode may be manufactured in a single chip together with the signal processing device using a simple CMOS manufacturing technique.

A three-dimensional image sensor may realize a three-dimensional color of an object by measuring the color of the object and/or a distance to the object.

A distance measuring sensor has been disclosed in U.S. Pat. No. 6,396,570. However, this distance measuring sensor may include double photogates on a light-incident surface. Thus, the amount of light may be reduced when passing through the photogates and/or a light sensing area may be reduced due to the double photogates, thereby reducing the sensitivity of distance measurement.

SUMMARY

Example embodiments may provide distance measuring sensors having an enlarged light receiving region that include photogates vertically formed in a substrate.

Example embodiments also may provide three-dimensional color image sensors including distance measuring sensors and/or color image sensors.

According to example embodiments, a distance measuring sensor may include: a photoelectric conversion region; a first charge storage region; a second charge storage region; a first trench; a second trench; a first vertical photogate; and/or a second vertical photogate. The photoelectric conversion region may be in a substrate. The photoelectric conversion region may be doped with a first impurity in order to generate charges in response to received light. The first and second charge storage regions may be in the substrate. The first and second charge storage regions may be doped with a second impurity in order to collect charges. The first and second charge storage regions may be separated from each other. The first trench may be formed to have a depth in the substrate that corresponds to the first charge storage region. The second trench may be formed to have a depth in the substrate that corresponds to the second charge storage region. The first vertical photogate may be in the first trench. The second vertical photogate may be in the second trench According to example embodiments, a three-dimensional color image sensor may include a plurality of unit pixels. Each unit pixel may include: a plurality of color pixels and/or a distance measuring sensor. The distance measuring sensor may include: a photoelectric conversion region; a first charge storage region; a second charge storage region; a first trench; a second trench; a first vertical photogate; and/or a second vertical photogate. The photoelectric conversion region may be in a substrate. The photoelectric conversion region may be doped with a first impurity in order to generate charges in response to received light. The first and second charge storage regions may be in the substrate. The first and second charge storage regions may be doped with a second impurity in order to collect charges. The first and second charge storage regions may be separated from each other. The first trench may be formed to have a depth in the substrate that corresponds to the first charge storage region. The second trench may be formed to have a depth in the substrate that corresponds to the second charge storage region. The first vertical photogate may be in the first trench. The second vertical photogate may be in the second trench.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION OF EXAMPLE EMBODIMENTS

Figure 1:
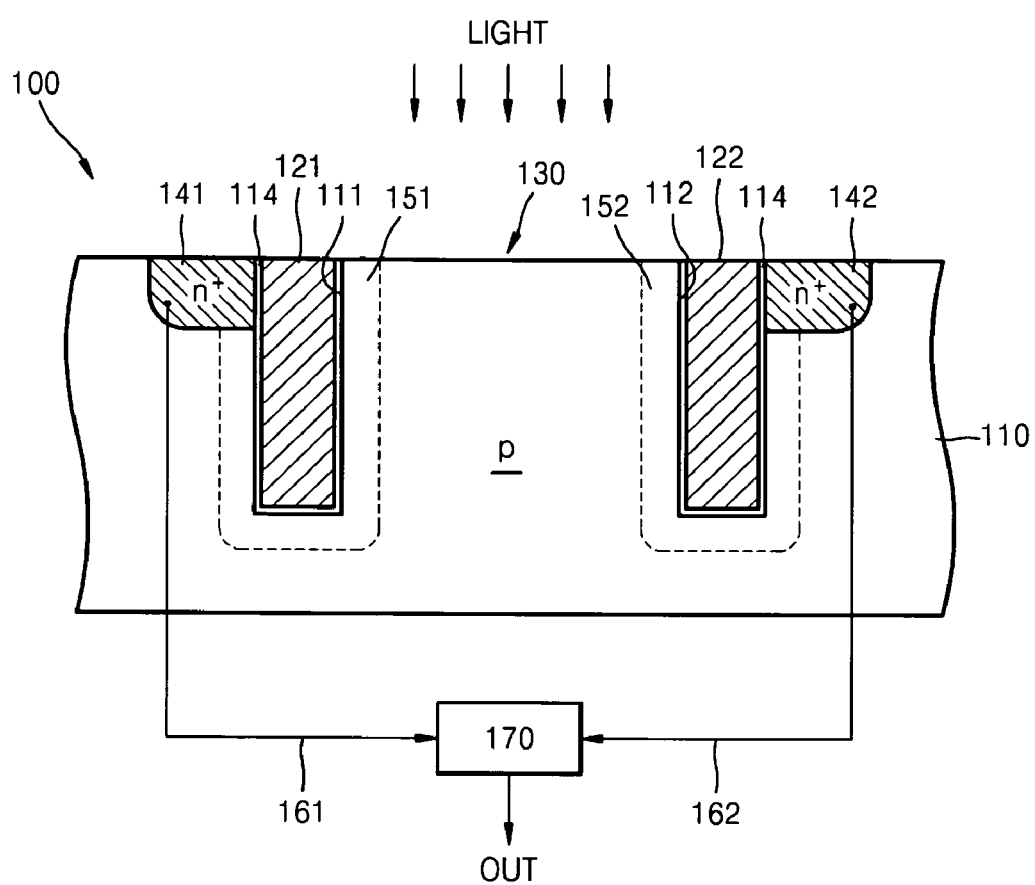
FIG. 1 is a schematic, cross-sectional view of a distance measuring sensor that includes a vertical photogate according to example embodiments.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions are exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, and/or components.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

FIG. 1 is a schematic, cross-sectional view of a distance measuring sensor 100 that includes a vertical photogate according to example embodiments.

Referring to FIG. 1, the distance measuring sensor 100 may include a first trench 111 and a second trench 112 that are separated from each other in a p-type substrate 110, a first vertical photogate 121 that is in the first trench 111, and/or a second vertical photogate 122 that is in the second trench 112. An insulating layer 114 may be formed between the p-type substrate 110 and the first vertical photogate 121 and/or between the p-type substrate 110 and the second vertical photogate 122. A region between the first trench 111 and the second trench 112 may be a photoelectric conversion region 130 that may generate charges in response to received light. Further, an infrared ray filter and/or a micro lens may be disposed above the p-type substrate 110. However, the infrared ray filter and the micro lens are not shown in FIG. 1. The distance measuring sensor 100 may include an enlarged light-receiving region due at least in part to first and/or second vertical photogates 121 and 122.

Charge storage region 141, which may be an n+ doped region, may be formed in the p-type substrate 110 in order to contact the first trench 111. Similarly, charge storage region 142, which also may be an n+ doped region, may be formed in the p-type substrate 110 in order to contact the second trench 112. Electrons from electron-hole pairs formed in the photoelectric conversion region 130 may be accumulated in one or both of the charge storage regions 141 and 142. When a positive voltage of, for example, 2 V (volts) to 3 V is applied to the first vertical photogate 121, n-type region 151 may be formed around the first vertical photogate 121 to which the positive voltage is applied, and electrons may move along the n-type region 151 and/or may be stored in the charge storage region 141. Similarly, when a positive voltage of, for example, 2 V to 3 V is applied to the second vertical photogate 122, n-type region 152 may be formed around the second vertical photogate 122 to which the positive voltage is applied, and electrons may move along the n-type region 152 and/or may be stored in the charge storage region 142. A first signal circuit 161, that may read first signals from the accumulated charges, may be connected to the charge storage region 141. Similarly, a second signal circuit 162, that may read second signals from the accumulated charges, may be connected to the charge storage region 142. The first signal circuit 161 and/or the second signal circuit 162 may be connected to a circuit processing unit 170. The circuit processing unit 170 may measure a distance to an object using a signal difference between the first signal and the second signal. One of ordinary skill in the art will recognize that there are many formulas for calculating the distance based on the difference between the first signal and the second signal in the circuit processing unit 170, and the detailed description of such formulas will be omitted.

The p-type substrate 110 may be, for example, a silicon substrate. The insulating layer 114 may be, for example, a silicon oxide. The first vertical photogate 121 and/or the second vertical photogate 122 may be formed, for example, of polysilicon or metal.

Figure 2:
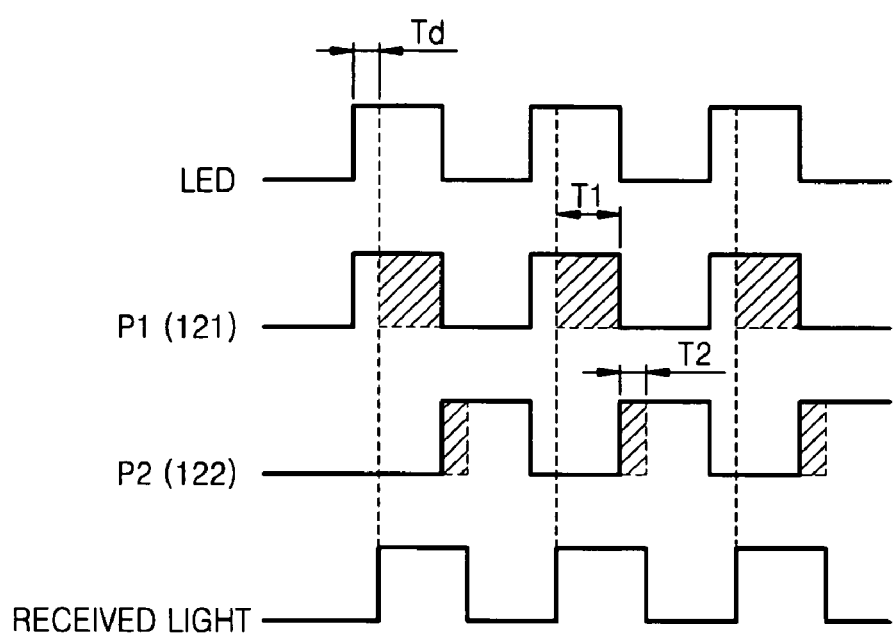
FIG. 2 is a timing diagram for explaining operation of a distance measuring sensor that includes a vertical photogate according to example embodiments.

FIG. 2 is a timing diagram for explaining operation of the distance measuring sensor 100 that includes a vertical photogate according to example embodiments. An operation of the distance measuring sensor 100 according to example embodiments will now be described with reference to FIGS. 1 and 2.

First, an object may be irradiated with an infrared ray from a light emitting device (LED) (not shown) included in the distance measuring sensor 100. For example, the light emitting device may emit a pulse optical signal in response to a pulse voltage. At this point, a pulse voltage synchronized with the pulse optical signal may be applied to the first vertical photogate 121, and a second pulse voltage having a phase difference with respect to the pulse optical signal may be applied to the second vertical photogate 122. The phase difference between the first pulse voltage and the second pulse voltage may or may not be predetermined. The phase difference between the first pulse voltage and the second pulse voltage may be, for example, about 180 degrees.

When the object located a distance from the distance measuring sensor 100 is irradiated with an infrared ray, the infrared ray may be reflected back from the object to the distance measuring sensor 100. The time elapsed until the infrared ray reaches the distance measuring sensor 100, after being reflected by the object, may vary according to the location of the object. In FIG. 2, the reflected light that enters the first and second vertical photogates 121 and 122 may be detected in a pulse signal with a delay time Td to the pulse optical signal from the light emitting device. Assuming that T1 is a time for overlapping the pulse signal of the reflected light with the pulse voltage applied to the first vertical photogate 121 and T2 is a time for overlapping the pulse signal of the reflected light with the pulse voltage applied to the second vertical photogate 122, the greater the difference between T1 and T2, the shorter the distance to the object.

When a positive voltage of, for example, 2 V to 3 V is applied to the first vertical photogate 121, the perimeter of the first vertical photogate 121 may be inverted to an n-type region 151 that may act as a charge path and, thus, charges generated from the photoelectric conversion region 130 (which may be doped, for example, with a first impurity) may move to the charge storage region 141 (which may be doped, for example, with a second impurity) along the inverted n-type region 151. An amount of the charges accumulated in the charge storage region 141 may be input to the circuit processing unit 170 as a first signal through the first signal circuit 161.

When a pulse voltage having a phase difference of, for example, about 180 degrees with respect to the pulse voltage of the first vertical photogate 121 is applied to the second vertical photogate 122, the perimeter of the second vertical photogate 122 may be inverted to an n-type region 152 that may act as a charge path and, thus, charges generated from the photoelectric conversion region 130 may move to the charge storage region 142 (which may be doped, for example, with the second impurity) along the inverted n-type region 152. An amount of the charges accumulated in the charge storage region 142 may be input to the circuit processing unit 170 as a second signal through the second signal circuit 162. Thus, the circuit processing unit 170 may determine a distance from the distance measuring sensor 100 to the object from the signal difference between the first signal and the second signal.

In the distance measuring sensor 100 according to example embodiments, the first and second vertical photogates 121 and 122 may be vertically formed in the p-type substrate 110. Thus, an expanded photoelectric conversion region 130 may be formed in a confined region, thereby increasing the sensitivity of the distance measuring sensor 100.

Figure 3:
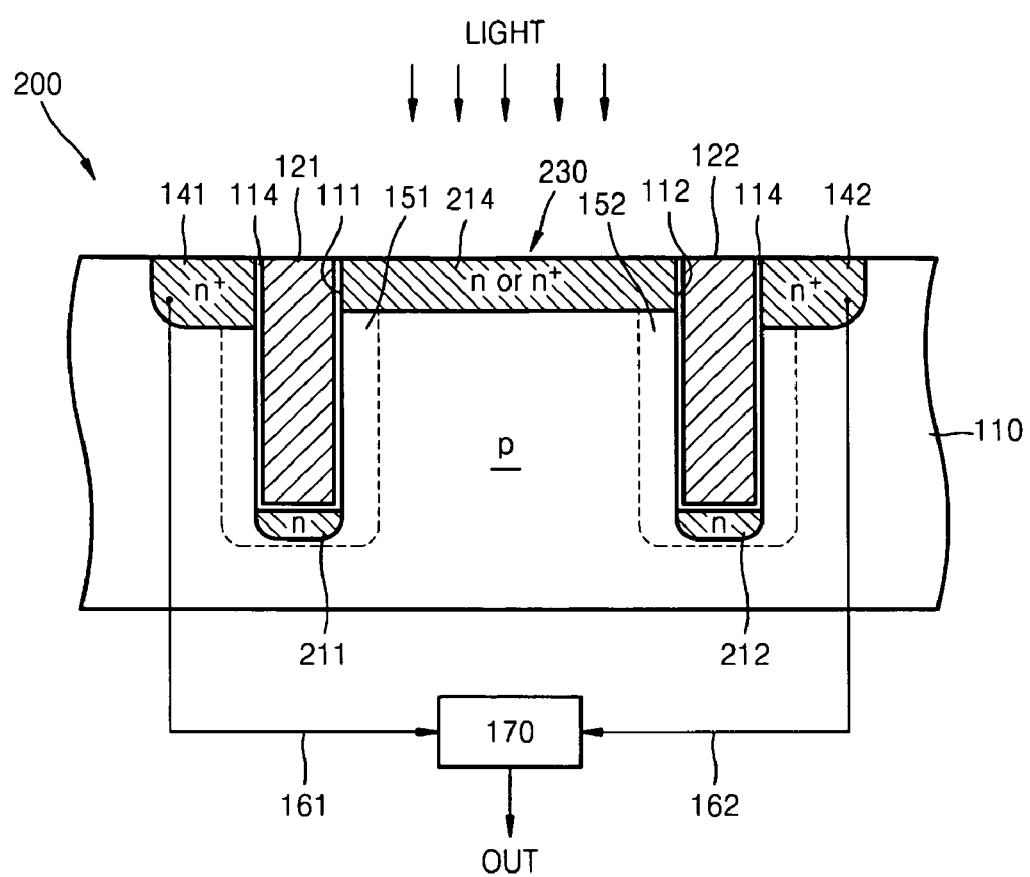
FIG. 3 is a schematic, cross-sectional view of a distance measuring sensor that includes a vertical photogate according to example embodiments.

FIG. 3 is a schematic, cross-sectional view of a distance measuring sensor 200 that includes a vertical photogate according to example embodiments. Like reference numerals are used to indicate elements substantially similar to the elements of the distance measuring sensor 100 of FIG. 1 and, thus, a detailed description of the substantially similar elements will not be repeated.

Referring to FIG. 3, the distance measuring sensor 200 further may include n-type regions 211 and/or 212 (which may be doped, for example, with the second impurity or a third impurity) formed under the first trench 111 and/or the second trench 112 in the p-type substrate 110. Also, an n-type or n+ type region 214 (which may be doped, for example, with the second impurity, the third impurity, or a fourth impurity) further may be formed on a surface of the p-type substrate 110 in a photoelectric conversion region 230 between the first and second photogates 121 and 122.

The n-type regions 211 and/or 212 may allow charges generated from the photoelectric conversion region 230 to readily move to corners of the lower parts of the first and/or second trenches 111 and 112 along the inverted n-type regions 151 and/or 152 that may be formed when a voltage is applied to the first and/or second vertical photogates 121 and 122.

The n-type or n+ type region 214 may expand an optical conversion region by forming a pn junction diode with the p-type substrate 110 and, accordingly, the optical receiving capacity of the distance measuring sensor 200 may be increased, thereby increasing the sensitivity of the distance measuring sensor 200.

The operation of the distance measuring sensor 200 of FIG. 3 may be substantially similar to the operation of the distance measuring sensor 100 of FIG. 1 and, thus, a detailed description of the operation will not be repeated.

Figure 4:
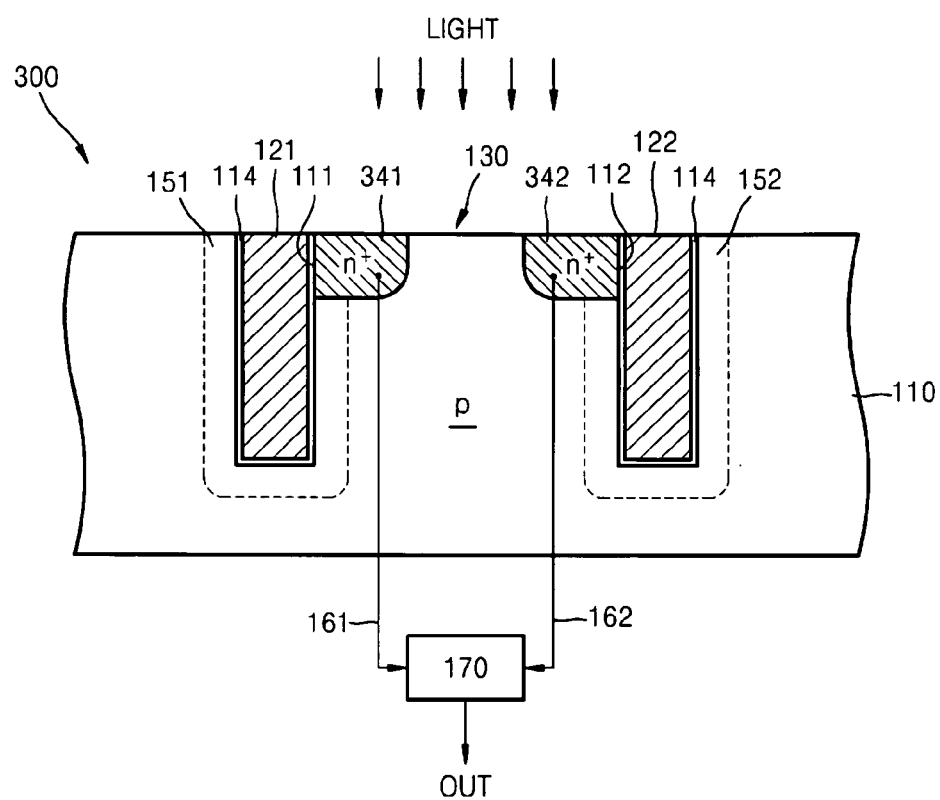
FIG. 4 is a schematic, cross-sectional view of a distance measuring sensor that includes a vertical photogate according to example embodiments.

FIG. 4 is a schematic, cross-sectional view of a distance measuring sensor 300 that includes a vertical photogate according to example embodiments. Like reference numerals are used to indicate elements substantially similar to the elements of the distance measuring sensor 100 of FIG. 1 and, thus, a detailed description of the substantially similar elements will not be repeated.

Referring to FIG. 4, the distance measuring sensor 300 may include first and/or second charge storage regions 341 and 342 formed in a p-type substrate 110 between the first trench 111 and the second trench 112, wherein the first and second charge storage regions 341 and 342 may be separated from each other and respectively contact the first trench 111 and/or the second trench 112. The first and/or second charge storage regions 341 and 342 may be n+ doped regions. Electrons from electron-hole pairs formed in a photoelectric conversion region 130 may be stored in the first and/or second charge storage regions 241 and 242.

The first and/or second charge storage regions 341 and 342 may be compactly formed in the photoelectric conversion region 130 of the distance measuring sensor 300. When a pulse voltage is applied to the first or second vertical photogate 121 and 122, the first or second charge storage regions 341 and 342 respectively may expand to an n-type region 151 or 152 to which a gate voltage may be applied and, thus, charges may move to the first or second charge storage region 341 or 342 along the expanded n-type region 151 or 152. Other operations of the distance measuring sensor 300 may be substantially similar to the operations of the distance measuring sensor 100 and, thus, detailed descriptions of the operations will not be repeated.

Figure 5:
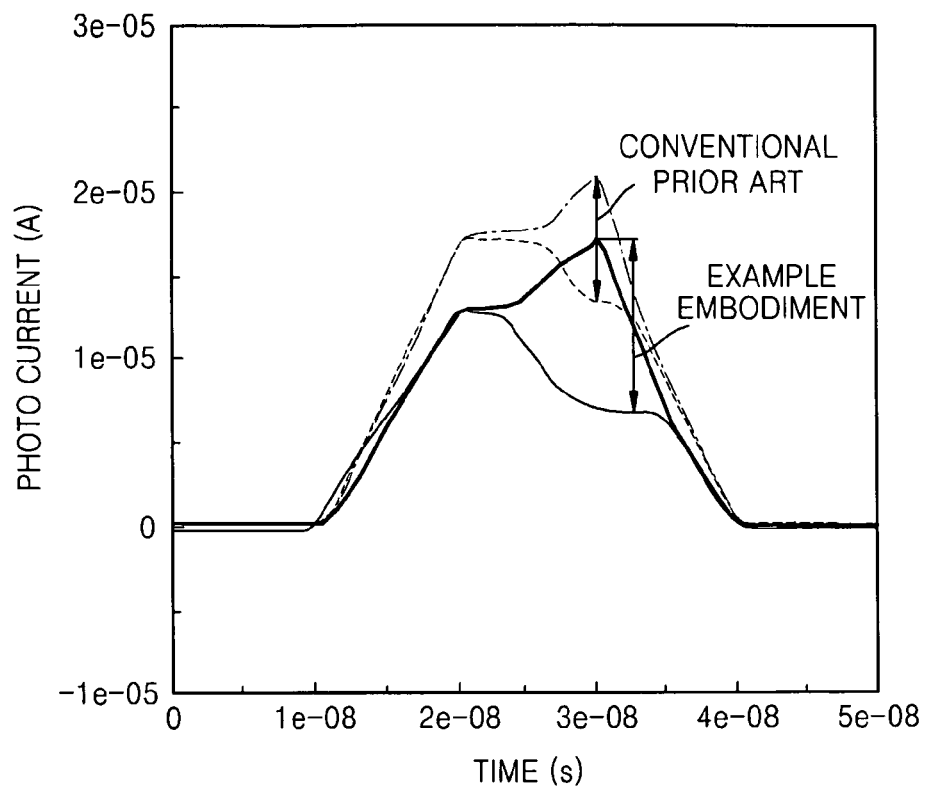
FIG. 5 is a graph comparing distance measuring sensitivity between the distance measuring sensor according to example embodiments and a conventional distance measuring sensor having planar double photogates above a substrate.

FIG. 5 is a graph comparing distance measuring sensitivity between the distance measuring sensor 100 according to example embodiments and a conventional distance measuring sensor having planar double photogates above a substrate. FIG. 5 shows a simulation result of a photo current (amps) in charge storage regions versus time (seconds) after irradiating the distance measuring sensors with an infrared ray. Each photogate of the distance measuring sensor 100 according to example embodiments and/or the conventional distance measuring sensor may have a width of about 0.4 μm (microns). A vertical length of the distance measuring sensor 100 may be about 1.0 μm.

Referring to FIG. 5, it may be seen that a current difference between the first and second charge storage regions according to example embodiments may be greater by approximately 50% or more than the current difference in the conventional distance measuring sensor.

Figure 6:
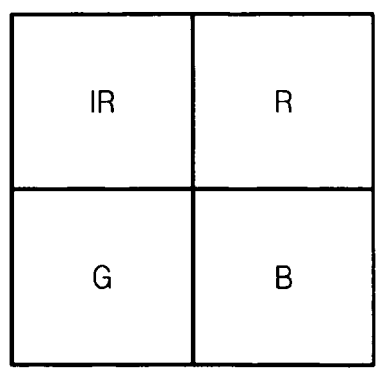
FIG. 6 is a plan view of a three-dimensional color image sensor according to example embodiments.

FIG. 6 is a plan view of a three-dimensional color image sensor 400 according to example embodiments.

The three-dimensional color image sensor 400 may include a plurality of unit pixels arranged in an array shape. Referring to FIG. 6, the unit pixel may include an infrared (IR) ray pixel IR and/or color pixels, for example, a red pixel R, a green pixel G, and a blue pixel B, for displaying color images. The infrared ray pixel IR may correspond to the distance measuring sensor 100 described above.

Figure 7:
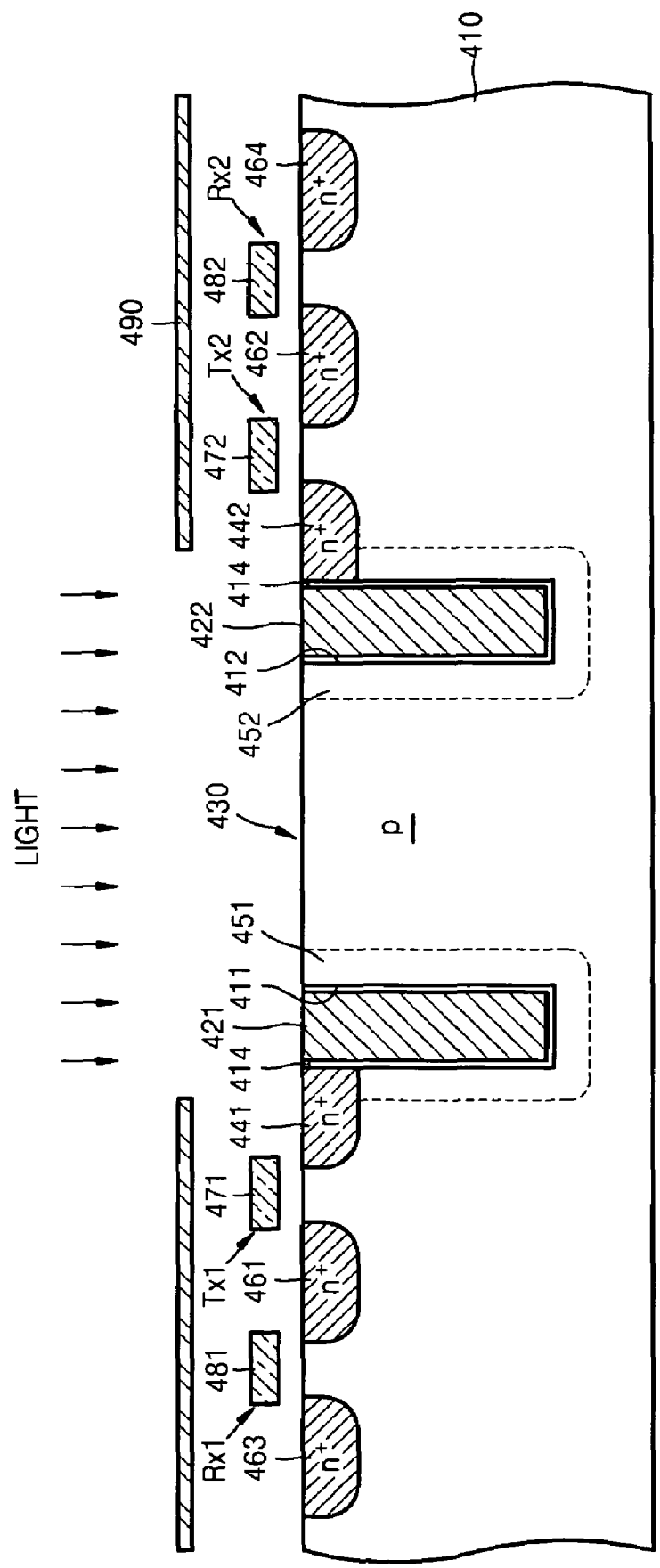
FIG. 7 is a cross-sectional view of a single sub-pixel of a unit pixel of a three-dimensional color image sensor according to example embodiments.

FIG. 7 is a cross-sectional view of a single sub-pixel of a unit pixel of a three-dimensional color image sensor according to example embodiments. The sub-pixel may be one of the red pixel R, the green pixel G, the blue pixel B, and/or the infrared ray pixel IR. Each of the sub-pixels may include, for example, a filter (not shown) corresponding to the respective sub-pixel and/or a micro lens (not shown) formed on or near the filter.

Referring to FIG. 7, the sub-pixel may include first and/or second trenches 411 and 412 and first and/or second vertical photogates 421 and 422 respectively disposed in the first and/or second trenches 411 and 412 in a p-type substrate 410. An insulating layer 414 may be formed between the p-type substrate 410 and the first and/or second trenches 411 and 412 to insulate them from each other. A region between the first and second trenches 411 and 412 may be a photoelectric conversion region 430 that may generate optical charges by receiving light.

Charge storage regions 441 and/or 442, that may be n+ doped regions, may be formed in the p-type substrate 410 in order to contact the first trench 411 and/or the second trench 412. Electrons from electron-hole pairs formed in the photoelectric conversion region 430 may be accumulated in the charge storage regions 441 and/or 442. When a positive voltage of, for example, 2 V to 3 V is applied to the first and/or second vertical photogates 421 and 422, n-type regions 451 and/or 452 may be formed around the first and/or second vertical photogates 421 and 422 to which the positive voltage is applied, and electrons may move along the n-type regions 451 and/or 452 and/or may be stored in the charge storage regions 441 and/or 442. A plurality of n+ regions may be formed in the p-type substrate 410 in a direction away from the charge storage regions 441 and/or 442. The n+ regions may be floating diffusion regions 461 and/or 462 and/or reset diffusion regions 463 and/or 464. Associated drive transistors and/or selection transistors are not shown in FIG. 7.

Transfer gates 471 and/or 472 may be formed between the charge storage regions 441 and/or 442 and the floating diffusion regions 461 and/or 462. Reset gates 481 and/or 482 may be formed between the floating diffusion regions 461 and/or 462 and the reset diffusion regions 463 and/or 464. The charge storage regions 441 and/or 442, the floating diffusion regions 461 and/or 462, and the transfer gates 471 and/or 472 may form transfer transistors Tx1 and/or Tx2, and the floating diffusion regions 461 and/or 462, the reset diffusion regions 463 and/or 464, and the reset gates 481 and/or 482 may form reset transistors Rx1 and/or Rx2.

The sub-pixel may include one or more light shields 490 formed, for example, of metal or dark-colored material to prevent light from being irradiated onto regions except the photoelectric conversion region 430 and, thus, to avoid noise which otherwise might occur when light is irradiate onto regions other than the photoelectric conversion region 430.

Figure 8:
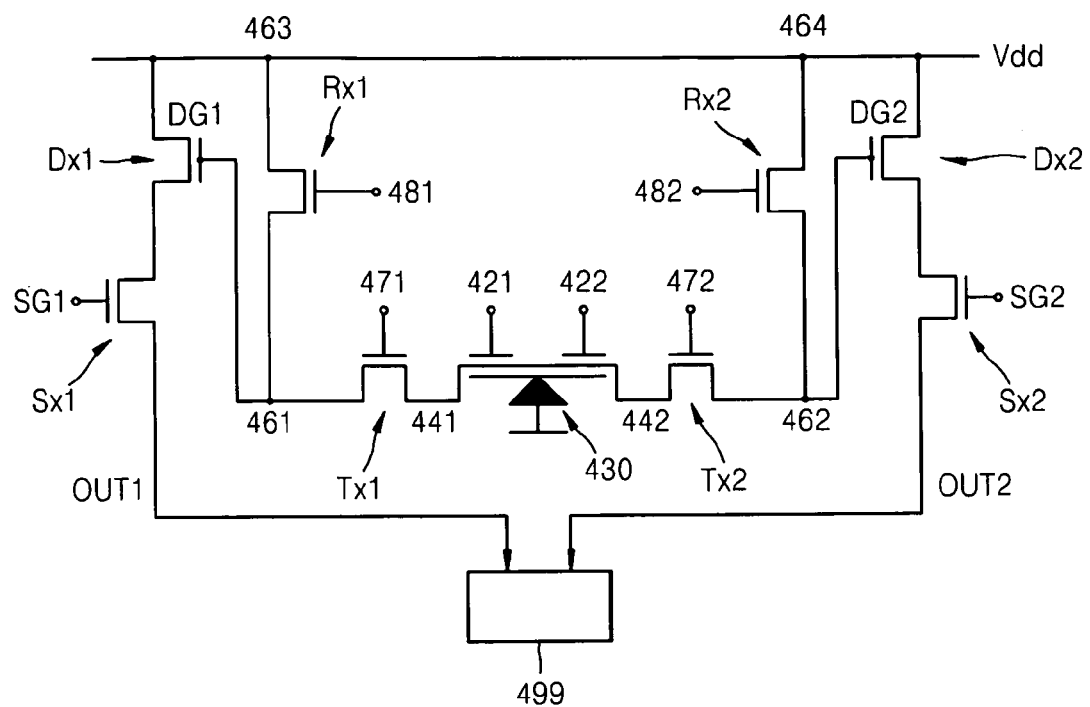
FIG. 8 is an equivalent circuit diagram of a sub-pixel of a three-dimensional color image sensor according to example embodiments.

FIG. 8 is an equivalent circuit diagram of a sub-pixel of a three-dimensional color image sensor according to example embodiments.

Referring to FIGS. 7 and 8, the photoelectric conversion region 430 may include the first and/or second vertical photogates 421 and 422, the transfer transistors Tx1 and/or Tx2, the reset transistors Rx1 and/or Rx2, the drive transistors Dx1 and/or Dx2, and/or the selection transistors Sx1 and/or Sx2. The transfer transistor Tx1, the reset transistor Rx1, the drive transistor Dx1, and/or the selection transistor Sx1 may be directly or indirectly connected to the first vertical photogate 421. Similarly, the transfer transistor Tx2, the reset transistor Rx2, the drive transistor Dx2, and/or the selection transistor Sx2 may be directly or indirectly connected to the second vertical photogate 422. Outputs OUT1 and/or OUT2 from the selection transistors Sx1 and/or Sx2 may be inputted to a circuit processing unit 499.

At the transfer transistors Tx1 and/or Tx2, voltages may be applied to transfer gates 471 and/or 472 to move electrons of the charge storage regions 441 and/or 442 to floating diffusion regions 461 and/or 462, respectively. At the reset transistors Rx1 and/or Rx2, voltages may be applied to reset gates 481 and/or 482 to reset voltages of the floating diffusion regions 461 and/or 462 to an input voltage Vdd. The drive transistors Dx1 and/or Dx2 may operate as a source follower amplifier(s). The selection transistors Sx1 and/or Sx2 may select a unit pixel in response to selection gates SG1 and/or SG2. The input voltage Vdd may be outputted to an output OUT1 and/or OUT2 through the drive transistors Dx1 and/or Dx2 and/or the selection transistors Sx1 and/or Sx2, respectively.

The p-type substrate 410 may be a silicon substrate. The insulating layer 414 may be a silicon oxide. The first and second vertical photogates 421 and 422 may be formed, for example, of polysilicon or metal.

If the sub-pixel is an infrared ray pixel, pulse voltages having different phases from each other may be applied to the first and second vertical photogates 421 and 422. The circuit processing unit 499 may calculate a difference between the outputs OUT1 and OUT2. If the sub-pixel is an infrared ray pixel, the transfer transistors Tx1 and/or Tx2, the reset transistors Rx1 and/or Rx2, the drive transistors Dx1 and/or Dx2, and/or the selection transistors Sx1 and/or Sx2 may correspond to the first and/or second signal circuits 161 and 162 in FIG. 1.

If the sub-pixel is a color pixel, a voltage may be simultaneously applied to the first and second vertical photogates 421 and 422, and the circuit processing unit 499 may calculate the sum of the outputs OUT1 and OUT2.

The operation of the sub-pixel will now be described with reference to FIGS. 7 and 8.

The source voltage of the reset transistors Rx1 and/or Rx2 may be reset to the input voltage Vdd by applying a voltage to the reset gates 481 and/or 482. When light is irradiated onto the photoelectric conversion region 430 through, for example, a corresponding micro lens, only light having a specific wavelength (or wavelengths in a given band) may be irradiated onto the photoelectric conversion region 430 via a corresponding filter. The specific wavelength (or wavelengths in a given band) may or may not be predetermined. Then, electron-hole pairs may be formed in the photoelectric conversion region 430, and electrons from the electron-hole pairs may move to the charge storage regions 441 and/or 442 through the n-type regions 451 and/or 452, which may be expanded from the regions of the first and/or second vertical photogates 421 and 422 to which a voltage is applied. When a voltage is applied to the transfer gates 471 and/or 472, charges of the charge storage regions 441 and/or 442 may move to the floating diffusion regions 461 and/or 462. The charges from the floating diffusion regions 461 and/or 462 may be converted to a voltage of drive gates DG1 and/or DG2 and, accordingly, the selection gates SG1 and/or SG2 may output voltages OUT1 and/or OUT2. Thus, a color image of an object or a distance to the object may be measured. In the case of the infrared ray pixel, pulse voltages having a phase difference from each other may be applied to the first and/or second vertical photogates 421 and 422, and/or the circuit processing unit 499 may measure a distance to the object using a difference between the outputs OUT1 and/or OUT2.

In the case of the color pixels, if a voltage is simultaneously applied to the first and second vertical photogates 421 and 422, the circuit processing unit 499 may measure an intensity of a corresponding color by adding values of the outputs OUT1 and OUT2. If voltages having a phase difference from each other are applied to the first and second vertical photogates 421 and 422 of any or all of the color pixels, the circuit processing unit 499 also may measure an intensity of a corresponding color by adding values of the outputs OUT1 and OUT2.

That is, since a color image may be acquired and a distance to an object may be measured, a three-dimensional image of the object may be realized.

In the above embodiment, the sub-pixel may have a similar structure to the distance measuring sensor 100 of FIG. 1. However, example embodiments are not limited to such similar structures. For example, the structure of the sub-pixel also may be used in conjunction with the distance measuring sensors 200 and/or 300, but the detailed descriptions of the distance measuring sensors 200 and 300 will not be repeated.

The color pixel may have a structure that is well-known in an image sensor having three or four transistors, instead of example embodiments described above, and one of ordinary skill in the art will understand that structure and its application to and in example embodiments.

While example embodiments have been particularly shown and described, it will be understood by those of ordinary skill in the art that various changes in form and details may be made therein without departing from the spirit and scope of the present invention as defined by the following claims.

What is claimed is:

1. A distance measuring sensor, comprising:
   a photoelectric conversion region;
   a first charge storage region;
   a second charge storage region;
   a first trench;
   a second trench;
   a first vertical photogate; and
   a second vertical photogate;
   wherein the photoelectric conversion region is in a substrate,
   wherein the photoelectric conversion region is doped with a first impurity in order to generate charges in response to received light,
   wherein the first and second charge storage regions are in the substrate,
   wherein the first and second charge storage regions are doped with a second impurity in order to collect charges,
   wherein the first and second charge storage regions are separated from each other,
   wherein the first trench is formed to have a depth in the substrate that corresponds to the first charge storage region,
   wherein the second trench is formed to have a depth in the substrate that corresponds to the second charge storage region,
   wherein the first vertical photogate is in the first trench, and
   wherein the second vertical photogate is in the second trench.

2. The distance measuring sensor of claim 1, wherein the first vertical photogate is formed to contact an outer side of the first charge storage region in the substrate, and
   wherein the second vertical photogate is formed to contact an outer side of the second charge storage region in the substrate.

3. The distance measuring sensor of claim 1, wherein the first vertical photogate is formed to contact the first charge storage region,
   wherein the second vertical photogate is formed to contact the second charge storage region, and
   wherein the first and second vertical photogates are separated from each other between the first and second charge storage regions.

4. The distance measuring sensor of claim 1, wherein the photoelectric conversion region comprises:
   a third region doped with the second impurity on a surface of the substrate.

5. The distance measuring sensor of claim 1, further comprising:
   fourth and fifth regions;
   wherein the fourth region is disposed under the first trench,
   wherein the fifth region is under the second trench, and
   wherein the fourth and fifth regions are doped with the second impurity.

6. The distance measuring sensor of claim 5, wherein the photoelectric conversion region comprises:
   a sixth region;
   wherein the sixth region is doped with the second impurity on a surface of the substrate.

7. The distance measuring sensor of claim 1, wherein the first and second vertical photogates are formed of polysilicon or metal.

8. The distance measuring sensor of claim 1, further comprising:
   an infrared ray filter.

9. The distance measuring sensor of claim 1, further comprising:
   a micro lens.

10. The distance measuring sensor of claim 1, further comprising:
    a first signal circuit; and
    a second signal circuit;
    wherein the first signal circuit is electrically connected to the first charge storage region, and
    wherein the second signal circuit is electrically connected to the second charge storage region.

11. The distance measuring sensor of claim 10, further comprising:
    a circuit processing unit;
    wherein the circuit processing unit is electrically connected to the first signal circuit and the second signal circuit.

12. The distance measuring sensor of claim 11, wherein the circuit processing unit receives a first signal from the first signal circuit,
    wherein the circuit processing unit receives a second signal from the second signal circuit, and wherein the circuit processing unit outputs a third signal representing a distance to an object using a difference between the first signal and the second signal.

13. A three-dimensional color image sensor, comprising:
a plurality of unit pixels;
wherein each unit pixel comprises:
a plurality of color pixels; and
the distance measuring sensor of claim 1.

14. The three-dimensional color image sensor of claim 13, wherein the first vertical photogate is formed to contact an outer side of the first charge storage region in the substrate, and
wherein the second vertical photogate is formed to contact an outer side of the second charge storage region in the substrate.

15. The three-dimensional color image sensor of claim 13, wherein the first vertical photogate is formed to contact the first charge storage region,
wherein the second vertical photogate is formed to contact the second charge storage region, and
wherein the first and second vertical photogates are separated from each other between the first and second charge storage regions.

16. The three-dimensional color image sensor of claim 13, wherein the photoelectric conversion region comprises:
a third region doped with the second impurity on a surface of the substrate.

17. The three-dimensional color image sensor of claim 13, further comprising:
fourth and fifth regions;
wherein the fourth region is under the first trench,
wherein the fifth region is under the second trench, and
wherein the fourth and fifth regions are doped with the second impurity.

18. The three-dimensional color image sensor of claim 17, wherein the photoelectric conversion region comprises:
a sixth region;
wherein the sixth region is doped with the second impurity on a surface of the substrate.

19. The three-dimensional color image sensor of claim 13, wherein the first and second vertical photogates are formed of polysilicon or metal.

20. The three-dimensional color image sensor of claim 13, wherein the color pixels comprise a red pixel, a green pixel, and a blue pixel, and
wherein each of the color pixels comprises:
a photoelectric conversion region;
a first charge storage region;
a second charge storage region;
a first trench;
a second trench;
a first vertical photogate; and
a second vertical photogate;
wherein the photoelectric conversion region is disposed in a substrate,
wherein the photoelectric conversion region is doped with a first impurity in order to generate charges in response to received light,
wherein the first and second charge storage regions are disposed in the substrate,
wherein the first and second charge storage regions are doped with a second impurity in order to collect charges,
wherein the first and second charge storage regions are separated from each other,
wherein the first trench is formed to have a depth in the substrate that corresponds to the first charge storage region,
wherein the second trench is formed to have a depth in the substrate that corresponds to the second charge storage region,
wherein the first vertical photogate is in the first trench, and
wherein the second vertical photogate is in the second trench.

\* \* \* \* \*